United States Patent [19]

Phillimore

[11] Patent Number: 4,490,770

[45] Date of Patent: Dec. 25, 1984

[54] OVERLOAD PROTECTION OF LOUDSPEAKERS

[76] Inventor: Horace R. Phillimore, 126 Oaks Rd., Millington, N.J. 07946

[21] Appl. No.: 269,571

[22] Filed: Jun. 2, 1981

Related U.S. Application Data

[63] Continuation-in-part of Ser. No. 011,914, Feb. 2, 1979, abandoned.

[51] Int. Cl.[3] ............ H02H 3/08

[52] U.S. Cl. ............ 361/94

[58] Field of Search ............ 361/94

[56] References Cited

U.S. PATENT DOCUMENTS 3,943,411 3/1976 Huszty et al. ............ 361/94

4,122,507 10/1978 Queen ............ 361/94

*Primary Examiner*—Harry E. Moose, Jr.

*Attorney, Agent, or Firm*—George E. Kersey

[57] ABSTRACT

Loudspeakers are protected against overloading by the inclusion of a magnetic reed switch between each speaker and its driver. The reed switch is operated by a sensor associated with the driver. This allows the switch to be operated, and remain operated, whenever the power level from the driver exeeds a prescribed value which could otherwise damage the speaker.

10 Claims, 5 Drawing Figures

FIG. 1
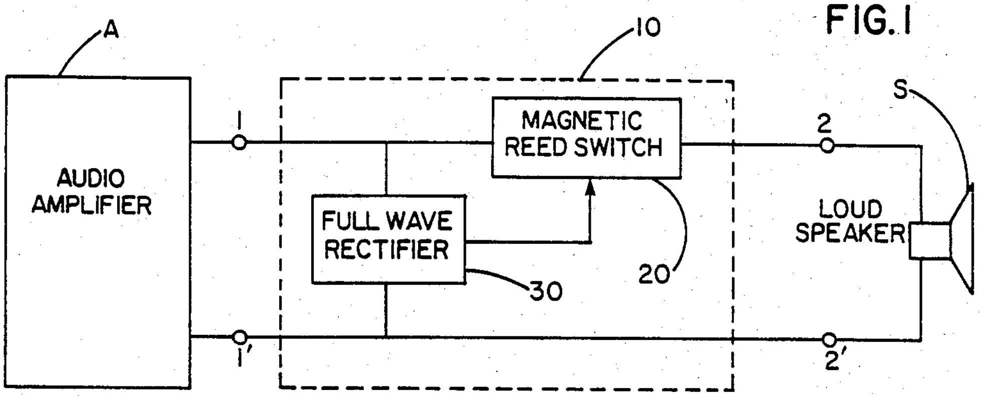
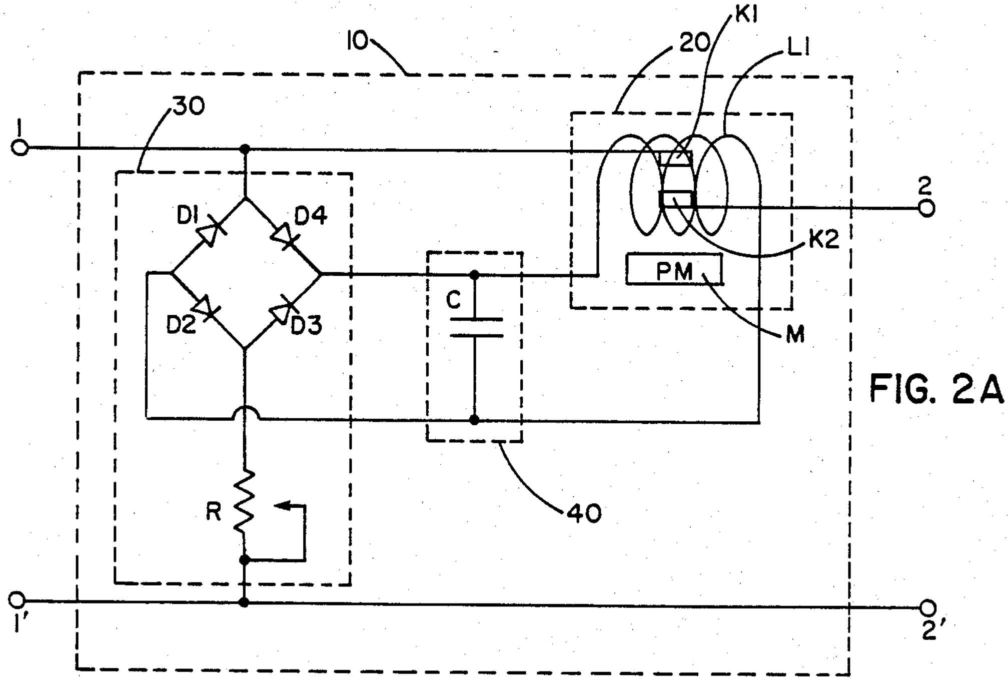
FIG. 2A
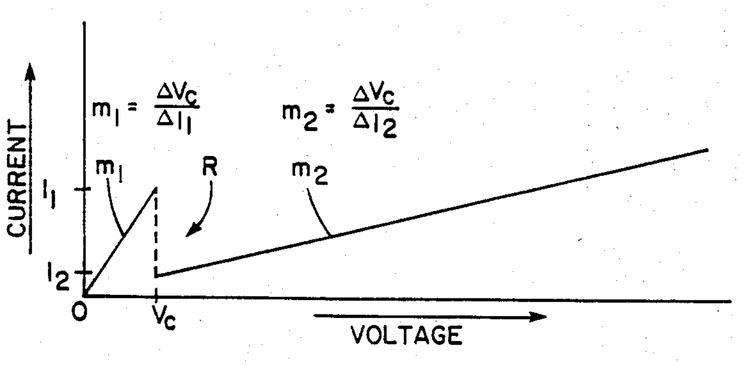
FIG. 2B

OVERLOAD PROTECTION OF LOUDSPEAKERS

This is a continuation-in-part of application Ser. No. 11,914 filed Feb. 2, 1979, now abandoned.

BACKGROUND OF THE INVENTION

This invention relates to the protection of loudspeakers, and, more particularly, to the protection of loudspeakers against overloading.

It is customary to operate audio amplifiers and their loudspeakers at comparatively high power levels. This produces an acoustical effect which many listeners have likened to that of a live musical source. Unfortunately, the operation of audio equipment at high power levels often damages their speakers.

Such damage usually occurs because the high power levels cause overheating in the voice coils of the speaker. As a result there is either destruction of the wire-to-bobbin bond in the speaker or the creation of a general open circuit that renders the speaker useless. In addition, overheating in the driving equipment can also have a destructive effect on speakers. This is particularly true of semiconductor output devices for which overheating causes short circuits. The speaker is then subjected to high, damaging levels to direct current.

It has been suggested that an overload switch could be included between a loudspeaker and its driver, to operate with a threshold power level is reached beyond which damage could take place. The usual switch is a complex thermal device which often fails or reacts to current overload too slowly particularly in the presence of high levels of direct current. The latter may be present either as components in an audio output signal or by virtue of short circuiting in one of or both drivers. In addition, conventional switches often react only to transients and thereafter restore themselves to their normal condition even though the overloading continues. This results in speaker damage if the overload continues.

Accordingly, it is an object of the invention to facilitate the protection of loudspeakers against overloading. A related object is to avoid overload conditions which could result in speaker damage, for example, by producing an open circuit or by destroying the wire-to-bobbin bond in a speaker.

Another object of the invention is to protect a speaker against overheating in the drive circuitry. A related object is to avoid speaker damage because of short circuiting, for example, of semiconductive devices which result in having the full current level of a power supply appear at the speaker terminals and bring about consequent damage.

A further object of the invention is to simplify overload switch protection. A releated object is a full range of protection with a simple switch. Another related object is to achieve steady state, as well as transient, overload protection.

SUMMARY OF THE INVENTION

In accomplishing the foregoing and related objects, the invention provides for the inclusion of a magnetic reed switch between a driver amplifier and each associated speaker. The reed switch is operated by a high impedance non-linear sensor at the output terminals of the driver amplifier. When the signal at the sensor reaches a threshold level representing an overload condition, it counteracts the permanent magnet that maintains the reed switch in its normally closed condition. This causes the switch to open and protect the speaker.

In accordance with one aspect of the invention, a non-linear high impedance results when the speaker load is removed, increasing the hold open signal on the reed switch so that once the switch has been opened it will remain open as long as the voltage level at the output of the driver amplifier is at an appreciably high level.

In accordance with another aspect of the invention, the sensor advantageously takes the form of a full wave rectifier in series with a non-linear resistor. This protects the speaker regardless of the polarity of an excessive direct current level in the driver or in its amplified output signal.

In accordance with a further aspect of the invention, the sensor desirably includes a filter that gives a comparatively accurate measure of the level of the overload signal.

DESCRIPTION OF THE DRAWINGS

Other aspects of the invention will become apparent after considering several illustrative embodiments taken in conjunction with the drawings in which:

FIG. 1 is a block and schematic diagram of a speaker overload protection arrangement in accordance with the invention;

FIG. 2A is a wiring diagram of one embodiment for implementing the overload protection arrangement of FIG. 1;

FIG. 2B is an illustrative voltage-current characteristic for the non-linear resistor of FIG. 2A;

DETAILED DESCRIPTION

Figure 3A:
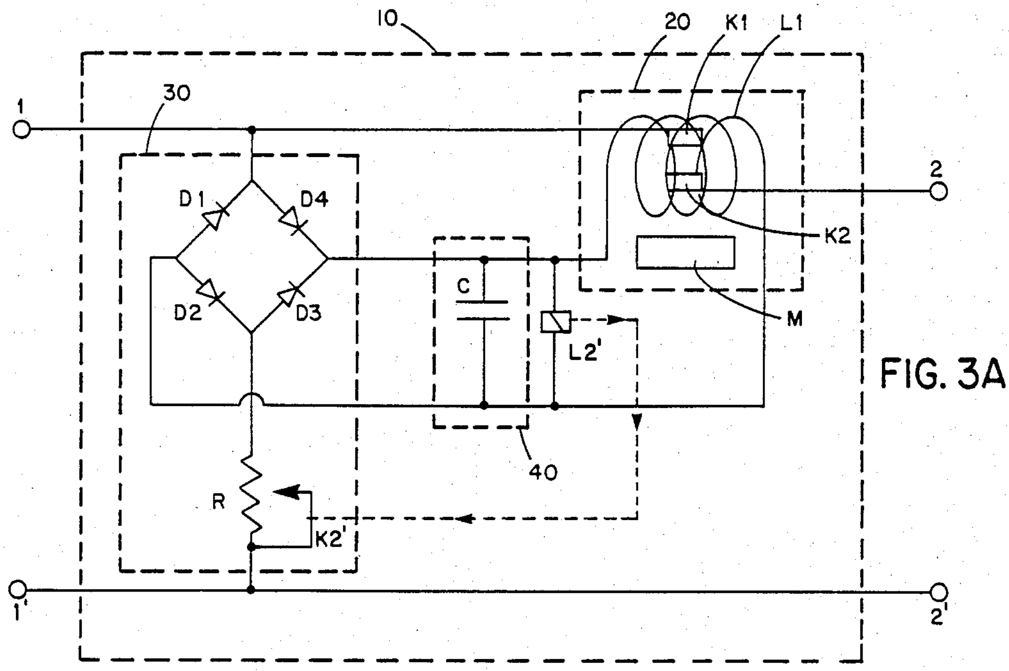
FIG. 3A is a wiring diagram of another embodiment for implementing the overload protection arrangement of FIG. 1.

Turning to the drawings, an overload protection system 10 for louspeakers in accordance with the invention is shown in FIG. 1 interconnecting an audio amplifier A with a loudspeaker S. The basic constituents for the overload protection system 10 are a reed switch 20 and a sensor 30. The reed switch 20 is interposed in a line between an output terminal 1 of an audio amplifier driver A and an input terminal 2 of a speaker S. The remaining terminals 1' and 2' of the driver amplifier and the speaker respectively are joined directly through the protector 10.

To operate the switch 20 when an overload condition is present, the sensor 30 is included in the protector 10 in shunt with the driver amplifier A interconnecting its terminals 1 and 1'. When the power output of the driver amplifier A exceeds a prescribed level, the voltage produced at the sensor is sufficient to generate a flux in the coil of the reed switch 20 to counteract the effect of a permanent magnet in the switch and cause the switch to open. The switch will not then reclose inadvertently as long as the voltage at the terminals of the sensor is at a sufficiently high level.

A detailed implementation of the overload protection circuitry 10 is shown in FIG. 2A. The sensor 30 takes the form of a full wave rectifier with bridge diodes D1 through D4 and an adjustable non-linear level control resistor R interconnecting terminals 1 and 1'. The remaining terminals are connected to a coil $L_1$ of the reed switch 20 through a filter 40 in the form of a capacitor C.

Because of the bridge rectifier, the speaker S is protected from steady state overloads of either polarity, for example, of the type commonly produced by a push-pull semiconductor output in the amplifier A. When the amplifier has a single output element, a half-wave rectifier may be employed in the sensor 30.

The purpose of the variable non-linear resistor R is to set the cutoff threshold level. In an impedane sense it is advantageous in that it makes the impedance (Z) of the detector many times that of amplifier output. A large value of resistance also provides protection against breakdown of the diodes in the bridge. On the other hand, it is advantageous for the resistance to be initially small in order to bring about a prompt response to the applied signals. Once the signals have acted in an overload condition, it is desirable for the resistance to be significantly increased in order to provide suitable protection for the diodes. For that purpose the resistor R is non-linear with a comparatively low magnitude of resistance for low voltages and a significantly higher magnitude of resistance for higher voltages.

A suitable characteristic of the non-linear resistor R is shown in FIG. 2B. For low values of voltage below a cut-off level $V_c$ the non-linear resistor R has a first slope $m_1$. This provides a comparatively low magnitude of resistance. When the voltage rises above the threshold $V_c$ the magnitude of resistance changes abruptly and thereafter has a slope $m_2$. The latter provides a comparatively high magnitude of resistance. The non-linear resistor R may be implemented in a variety of ways, one of which is discussed more particularly below in connection with the discussion of FIG. 3A.

The filter 40 is used to reduce the amount of ripple in the control signal applied to the coil $L_1$ of the reed switch 20. The filter 40 may have any desired number of elements, the the capicitor C will typically suffice.

The reed switch 20 includes two contacts $K_1$ and $K_2$ that are maintained in a normally closed position by a small permanent magnet M. When the coil $L_1$ is energized it produces a flux field that counteracts the field of the magnet, causing the contacts to separate when the applied field slightly exceeds that of the permanent magnet M.

Once an overload condition is sensed, causing the reed switch 20 to act as a circuit breaker, it can be re-set by merely reducing the gain of the audio amplifier A. Of course, if the overload has produced a short circuit in the output of the amplifier A, it is first necessary to correct that condition.

One implementation of the non-linear resistor R is shown in FIG. 3A. In this particular case the desired non-linear resistance characteristic, for example that of FIG. 2B, is achieved by using a variable high impedance resistor and using various portions of the resistor to provide the characteristics shown in FIG. 2B. In FIG. 3A the adjustable tap includes in its arm a set of relay contacts $K_2$ which are normally closed. For this condition the resistance that appears in the circuit is that portion of the resistor R between the diode bridge and the tap. This portion has the slope $m_1$ shown in FIG. 2B. In order to switch the non-linear resistor R to the slope $m_2$ shown in FIG. 2B the relay coil $L_2$ becomes energized when the contacts $K_1$ of the control coil $L_1$ are opened in an overload situation.

Figure 3B:
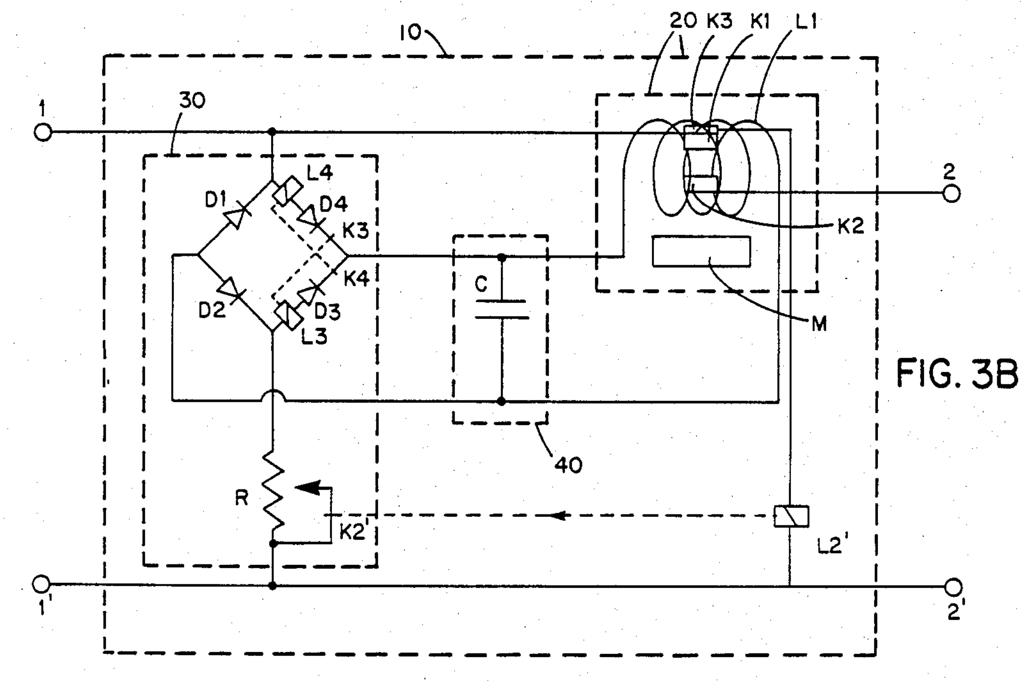
FIG. 3B is a wiring diagram of a further embodiment for implementing the overload protection arrangement of FIG. 1.

Another embodiment of the invention is shown in FIG. 3B in which the main coil $L_1$ includes a second set of contacts $K_3'$ associated with the relay $L_2$. When an overload situation occurs the main circuit is now closed to the coil $L_2$, through contacts $K_1$ and $K_3'$. This causes operation of the contacts $K_2$ in the arm of the tap as before. In addition the embodiment of FIG. 3B includes a coil $L_3$ in the branch of the diode $D_3$ and a second coil $L_4$ in the branch of the diode $D_4$. The contacts $K_3$ associated with the coil $L_3$ are in the same branch as the diode $D_4$. Conversely, the contacts $K_4$ associated with the coil $L_4$ are in the branch with the diode $D_3$. When an overload condition occurs the reverse biased branch of the diode rectifier is opened. For example, when current flows through the coil $L_3$ the associated contacts $K_3$ are opened and it thus becomes impossible for a voltage breakdown of the diode $D_4$ to occur.

With reference to FIG. 3B it is noted that the coils $L_3$ and $L_4$ are selected to energize their associated contacts $K_3$ and $K_4$ only when a prescribed current level has been allowed which is associated with an overload condition.

While various aspects of the invention have been set forth by the drawings and specification, it is to be understood that the foregoin detailed description is for illustration only and that various changes in parts, as well as the substitution of equivalent constituents for those shown and described may be made without departing from the spirit and scope of the invention as set forth in the appended claims.

What is claimed is:

1. An overload protection unit comprising a reed switch for interconnecting a driver with a load; and a sensor for monitoring the output of said driver, which comprises (a) a rectifier, (b) a resistor connected in series with said rectifier and having resistive values which change when said reed switch operates, (c) means for connecting said rectifier to operate said reed switch when an overload condition is sensed, and (d) means associated with said reed switch for changing the resistive value of said resistor whereby an overload condition sensed by said rectifier causes said reed switch to operate and said protective resistor to simultaneously change its resistive value in order that said rectifier is protected simultaneously with the operation of said reed switch to protect said load.

2. An overload protection unit in accordance with claim 1 wherein said sensor operates said reed switch through a filter.

3. An overload protection unit in accordance with claim 2 wherein said filter comprises a capacitor.

4. An overload protection unit in accordance with claim 1 wherein said sensor is a full-wave rectifier and said reed switch includes a coil that is connected to said rectifier.

5. An overload protection unit in accordance with claim 4 wherein said full-wave rectifier is composed of bridge connected diodes with a suitable filter capacitor, with intermediate terminals connected to the coil of said reed switch and a permanent magnet that normally maintains the switch contacts in a closed position but is conteractable by a field produced in said coil by said rectifier.

6. An overload protection unit in accordance with claim 1 wherein said rectifier is a full-wave rectifier with forward and reverse conduction branches and one of said branches includes a relay for opening the other of said branches thereby to prevent a voltage applied to the first branch from damaging the rectifying element in the second branch because of the application of an excess voltage level thereto.

7. An overload protection unit in accordance with claim 6 wherein the second branch also includes a relay for disabling the first branch when an overload signal in said second branch is sensed.

8. An overload protection unit in accordance with claim 1 wherein the means for changing the resistive value of said resistor comprises a relay connected to said reed switch for acting upon switching contacts included with said protective resistor.

9. An overload protection unit in accordance with claim 8 wherein said relay is connected to an auxiliary contact of said reed switch.

10. An overload protection unit in accordance with claim 8 wherein said relay is connected in shunt with said reed switch.

* * * * *